United States Patent Office 3,429,066
Patented Feb. 25, 1969

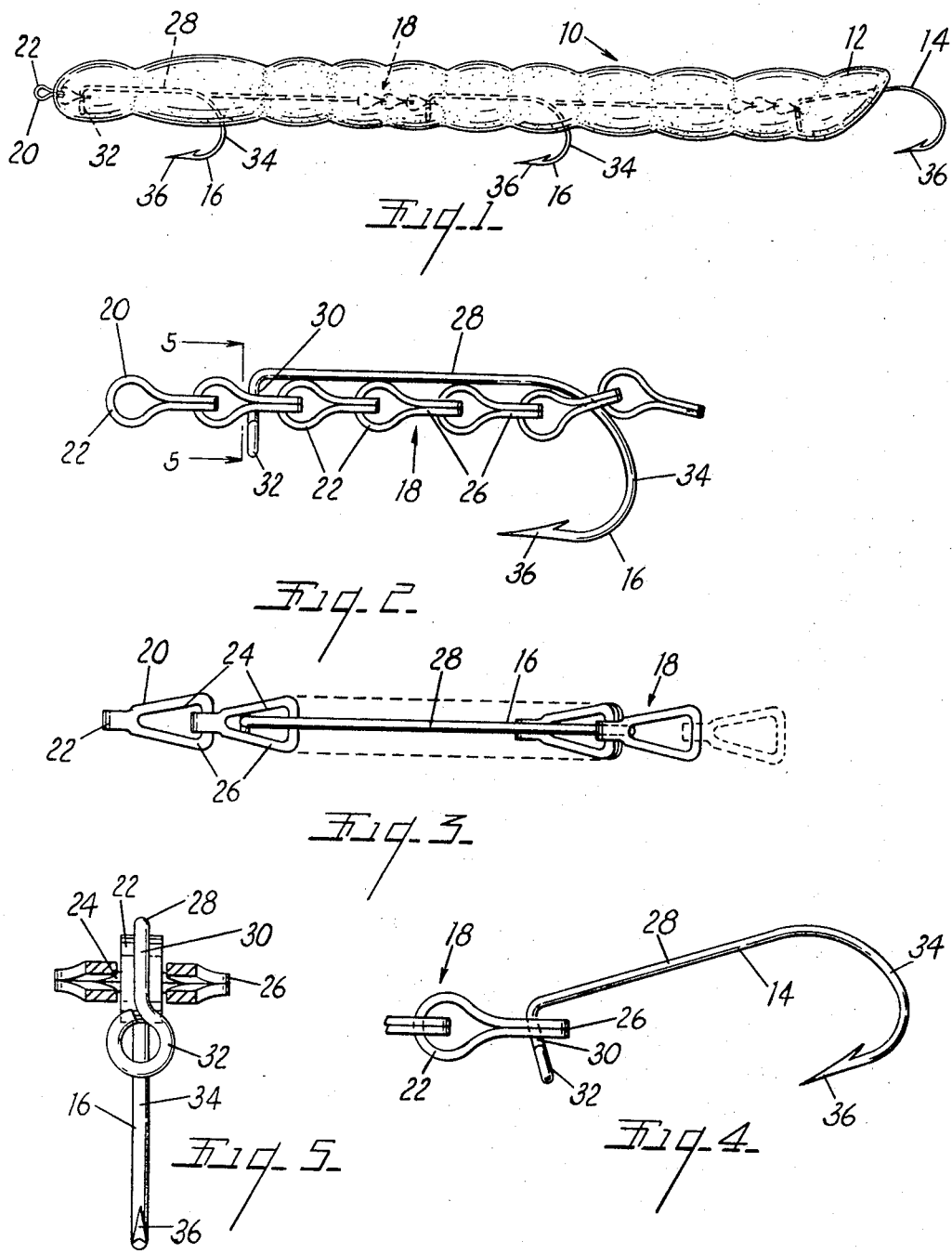

3,429,066
CHAIN REINFORCED PLASTIC WORM FISH LURE WITH HOOK SHANKS THREADED ON CHAIN
Bingham A. McClellan, Traverse City, Mich., assignor to Burke Flexo-Products Company, Traverse City, Mich.
Filed Aug. 9, 1967, Ser. No. 659,421
U.S. Cl. 43—42.24                                    6 Claims
Int. Cl. A01k 85/00

ABSTRACT OF THE DISCLOSURE

An elongated plastic body of worm or eel-like shape having a metal chain molded in the body and extending therealong with one link exposed at the front end. The links of the chain are of folded sheet metal forming a loop at the folded end, with lapped ends of the sheet having holes therethrough receiving the looped end of adjacent links. Plural hooks spaced along the body have straight shanks extending longitudinally within the body with right angle bends on their front end extending through the holes in one link to eyes on the ends of the bent portions in retained engagement with the opposite sides of the links. The curved hook ends of the hooks are threaded through the holes in a rearwardly spaced link of the chain with the barbed ends projecting from the body and faced forwardly. A rear hook has a right angle bend and eye on the front of its shank similarly engaged through the rear link of the chain, with a straight portion of its shank embedded in the body and projecting rearwardly from the body to a forwardly curved hook and barbed end.

---

This invention relates to improvements in a fish lure with a chain-reinforced elongated body and hooks threaded through the chain.

An elongated soft molded plastic body of eel-like or worm-like shape having a metal link reinforcing chain molded therein has one or more hooks connected thereto by a connection that yieldably locates the hook relative to the chain and the body. The hook connection is characterized by a laterally-bent eye on the front end of the shank of the hook disposed on one side of the chain with the shank extending through one link and along the opposite side of the chain to a rearwardly spaced link where the curved hook end extends through another link to the curved hook end with the barb of the hook projecting from the side of the body.

A rear hook on the body has a similar laterally-bent end threaded through the rear link of the chain with an eye on the shank in retaining engagement with the link. The shank of the hook is yieldably supported by the rear end of the body and projects therefrom to the forwardly curved hook end of the hook.

The connections between the chain and the hooks require no extra parts, while permitting the chain and body of the lure to bend freely. The connection locates the curved hooked ends of the hooks close to the side of the body while transmitting the load of a hooked fish directly to the chain. The hooks are fixed relative to the body so that the weight of the hooked ends tends to roll the body so that the hooks project from the bottom.

The connection between the rear hook and the chain permits the hook to support the chain within a mold cavity while the body is molded around the chain. The shank of the rear hook may extend at an angle from the axis of the body so that the forwardly-curved rear hook end is located close to the axis of the chain, behind the rear end of the body. This permits the body to act as a weed guard for the rear hook.

The drawings of which there is one sheet illustrate a highly practical form of fishing lure and the shank reinforced hook connections thereto.

FIGURE 1 is a side elevational view of the lure.
FIGURE 2 is a fragmentary enlarged side elevational view of the front end of the reinforcing chain and the front hook of the lure.
FIGURE 3 is a fragmentary top plan view of the chain and hook shown in FIGURE 2.
FIGURE 4 is a fragmentary enlarged side elevational view of the rear end of the chain and the rear hook shown in FIGURE 1.
FIGURE 5 is a cross sectional view taken along the plane of the line 5—5 in FIGURE 2.

The body of the lure indicated generally at 10 is molded of flexible material such as synthetic plastic and is shaped to resemble a natural fish food such as the angleworm or night crawler illustrated. Alternatively the body may be given the configuration and surface appearance of an eel or other elongated creature. The rear end of the body 10 has an upturned or thickened portion 12 with a rear hook 14 projecting therefrom. Plural intermediate hooks 16 project from a surface of the body and it is pointed out that the weight of these hooks tends to roll the body so that hooks project from the bottom of the lure in use. The hooks are connected to links of a chain that is folded through the center of the body and which is indicated generally at 18. The forward link 20 of the chain projects from the front of the lure for attachment to a leader or other fishing tackle connection.

As is shown more clearly in FIGURES 2, 3 and 5, the chain is formed of folded sheet metal links having loops 22 at their forward ends and holes 24 formed through the lapped rear ends 26 of the links. The loop 22 of each link passes through the hole 24 of a preceding link. Other forms of metal chains may be used but the disclosed form is particularly adapted to have the hooks connected thereto as will be described.

The leading hook or hooks 16 have straight shanks 28 that are lapped along the top of the chain. The chains have laterally or downwardly bent forward ends 30 that are passed through the holes 24 in the lapped ends 26 of one link and the ends of the bent portions 30 are formed into eyes 32 that are of greater diameter than the sides of the holes 24 so that the hook cannot be pulled through the chain. The straight shanks 28 extend along several links 18 of the chain to where the curved ends 34 of the hooks ase threaded downwardly through the holes 24 in rearwardly spaced links. The hook ends 34 thus curve forwardly to the barbed ends 36.

The rear hook 14 has the same laterally bent end 30 as the leading hooks and the end is passed downwardly through the hole 24 in the rear link of the chain where another eye 32 retains the hook of the chain. The straight shank 28 of the rear hook is supported along part of its length by the rear end 12 of the body and as is illustrated in FIGURE 1 the rear hook 14 may be angled upwardly and rearwardly so that the barbed end 36 is located adjacent to the axis of the chain and behind the rear end of the body so that the body tends to prevent the rear hook from being snagged or catching on weeds as the lure is pulled through the water.

What is claimed as new is:
1. An artificial fish lure having an elongated molded body with a metal reinforcing chain molded therein, and hooks connected to said chain and projecting from the body, the relationship between said body, chain and hooks being characterized by:
  generally straight shanks on said hooks embedded in said body,
  laterally bent ends on the forward ends of said shanks passed through a link of said chain, and eyes on the ends of said bent ends engaged with the opposite side of the chain from said shanks.

2. An artificial fish lure as defined in claim 1 in which the shank of one of said hooks extends rearwardly along one side of said chain and curves laterally at its rear end through another link of the chain.

3. An artificial fish lure as defined in claim 2 in which there is another hook like the first hook having an eye connected to the rear link of the chain in the same manner as the eye of the first hook.

the shank of the rear hook extending at an angle from the axis of the chain and through the rear end of the body located rearwardly of the chain.

4. An artificial fish lure as defined in claim 2 in which the links of said chain are folded sheets of metal forming loops at their folds and having lapped ends defining holes passing the bend and shank of said hook.

5. An artificial fish lure as defined in claim 2 in which said molded body is formed of soft resilient material.

6. An artificial fish lure having a metal chain, a hook connected to the chain intermediate of its length, and a body of synthetic plastic molded around the chain and the adjacent portion of the hook, said lure being characterized by:

said hook having a shank lapped along several links of said chain and being threaded through one link at the bend of the hook, and an eye on the end of the shank connected to another link of the chain in transversely restrained and in longitudinal load transmitting relation to the chain, said molded body surrounding the said chain and adjacent portions of said hook at said one link and at said other link, said hook having a barbed end projecting from said molded body.

References Cited

UNITED STATES PATENTS

| | | | |
|---|---|---|---|
| 2,316,048 | 4/1943 | Clarke | 43—44.2 |
| 2,722,766 | 11/1955 | Accetta | 43—42.24 |
| 3,344,550 | 10/1967 | Peters | 43—42.24 X |

SAMUEL KOREN, *Primary Examiner.*

D. J. LEACH, *Assistant Examiner.*

U.S. Cl. X.R.

43—44.2